US011809193B2

(12) United States Patent
Wu et al.

(10) Patent No.: US 11,809,193 B2
(45) Date of Patent: Nov. 7, 2023

(54) DATA-DRIVEN CONTROL FOR AUTONOMOUS DRIVING

(71) Applicant: TUSIMPLE, INC., San Diego, CA (US)

(72) Inventors: Yujia Wu, San Diego, CA (US); Zijie Xuan, San Diego, CA (US); Arda Kurt, San Diego, CA (US)

(73) Assignee: TUSIMPLE, INC., San Diego, CA (US)

(*) Notice: Subject to any disclaimer, the term of this patent is extended or adjusted under 35 U.S.C. 154(b) by 254 days.

(21) Appl. No.: 16/934,989

(22) Filed: Jul. 21, 2020

(65) Prior Publication Data

US 2022/0026912 A1 Jan. 27, 2022

(51) Int. Cl.
*G05D 1/02* (2020.01)

(52) U.S. Cl.
CPC ......... *G05D 1/0221* (2013.01); *G05D 1/0219* (2013.01); *G05D 1/0246* (2013.01)

(58) Field of Classification Search
CPC .. B60T 2210/12; B60T 2270/86; B60T 8/171; B60T 8/172; B60W 2400/00; B60W 2050/0016; B60W 2050/0025; B60W 2050/0033; B60W 2050/0034; B60W 2050/0052; B60W 2050/0088; B60W 2050/0215; B60W 2520/10;
(Continued)

(56) References Cited

U.S. PATENT DOCUMENTS 9,747,543 B1     8/2017  Martin et al.
2004/0245378 A1* 12/2004 Nonami ............... G05D 1/0858
                                                                244/17.13
(Continued)

FOREIGN PATENT DOCUMENTS

CN      108388270 A      8/2018
EP        1103938 A1 *   5/2001 ........... G05D 1/0261

OTHER PUBLICATIONS

Brunton, S.L. et al., "Discovering governing equations from data by sparse identification of nonlinear dynamical systems", Proceedings of the National Academy of Sciences, 113(15), pp. 3932-3937, Apr. 12, 2016.
Balas, G. et al., "Robust Control Toolbox 3: User's Guide", Matlab, Version 3, 2005.
Packard, A. et al., "The complex structured singular value", Automatica, 29(1), pp. 71-109, 1993.

*Primary Examiner* — Yuen Wong
*Assistant Examiner* — Carville Albert Hollingsworth, IV
(74) *Attorney, Agent, or Firm* — Paul Liu; Glenn Theodore Mathews Perkins Coie, LLP

(57) ABSTRACT

Techniques are described to determine parameters and/or values for a control model that can be used to operate an autonomous vehicle, such as an autonomous semi-trailer truck. For example, a method of obtaining a data-driven model for autonomous driving may include obtaining data associated with a first set of variables that characterize movements of an autonomous vehicle over time and commands provided to the autonomous vehicle over time, determining, using at least the first set of data, non-zero values and an associated second set of variables that describe a control model used to perform an autonomous driving operation of the autonomous vehicle, and calculating values for a feedback controller that describes a transfer function used to perform the autonomous driving operation of the autonomous vehicle driven on a road.

18 Claims, 5 Drawing Sheets

(58) Field of Classification Search
CPC ....... B60W 2520/125; B60W 2520/26; B60W 2520/14; B60W 2540/18; B60W 2520/263; B60W 2552/40; B60W 2556/25; B60W 30/00; B60W 30/18172; B60W 40/068; B60W 40/105; B60W 40/109; B60W 40/114; G05D 1/0223; G05D 2201/0213; G05D 1/0088; G05D 1/027; G05D 2201/0212; G05D 1/0221; G05D 1/0219; G05D 1/0246; B62D 15/021; B60R 16/0231; G01C 21/16; G01C 21/20; G01C 21/32; G01C 23/00; G01C 25/00; B01D 18/00; G01P 21/00; G06F 17/18; G06F 2110/10; G06F 30/20; G06F 16/2228; G06F 16/29; G08G 1/0112; G08G 1/0129; G06T 17/05; H04L 67/12; G05B 2219/37612; G05B 2219/41133; G05B 2219/41187

See application file for complete search history.

(56) References Cited

U.S. PATENT DOCUMENTS

| | | | |
|---|---|---|---|
| 2013/0197792 A1* | 8/2013 | Wolfram | G01C 23/00 701/124 |
| 2016/0139599 A1* | 5/2016 | Czlapinski | B62D 53/08 701/41 |
| 2017/0233001 A1* | 8/2017 | Moshchuk | G05D 1/021 701/42 |
| 2018/0297587 A1* | 10/2018 | Kasaiezadeh Mahabadi | B60W 10/04 |
| 2019/0056736 A1* | 2/2019 | Wood | G05D 1/0088 |
| 2019/0195631 A1* | 6/2019 | Xiong | G01C 21/188 |
| 2019/0322313 A1* | 10/2019 | Münch | B60W 50/06 |
| 2020/0149894 A1* | 5/2020 | Park | G06V 40/25 |
| 2020/0183341 A1* | 6/2020 | Vau | G05B 13/04 |
| 2020/0309564 A1* | 10/2020 | Shakibay Senobari | G01C 21/18 |
| 2021/0247768 A1* | 8/2021 | Hygh | G05D 1/0212 |
| 2021/0403051 A1* | 12/2021 | Jaegal | B60W 40/02 |

* cited by examiner

DATA-DRIVEN CONTROL FOR AUTONOMOUS DRIVING

TECHNICAL FIELD

This document relates to techniques to determine control models to operate autonomous vehicles.

BACKGROUND

Autonomous driving technology can allow a vehicle to perceive the position and movement of vehicles around an autonomous vehicle, and based on the perception, navigate and control the autonomous vehicle to safely drive towards a destination. Based on Society of Automotive Engineers (SAE) J3016 automated-driving standard, autonomous driving is divided into six categories based on capabilities, from SAE Level Zero (no automation) to SAE Level 5 (full vehicle autonomy).

SUMMARY

Techniques are disclosed to determine parameters for a control model, and to develop a control algorithm based on the control model to operate an autonomous vehicle, such as an autonomous semi-trailer truck. This patent document also describes techniques to determine a control algorithm that can be used for SAE level 4 autonomous driving which is considered full automation under constrained scenarios.

A method of obtaining a data-driven controller for autonomous trucks may include at least three steps. At a first step, a first set of data is collected where the first set of data is associated with a first set of variables that characterize motion of an autonomous truck over time and commands provided to the autonomous vehicle over time. At a second step, an optimization problem is constructed with a first matrix based on the first set of data, and a vector that describes the motion model of the autonomous truck is solved. At the second step, the non-zero terms of the vector dictate or determine the active terms of the equations of motion. At the third step, a robust feedback controller is obtained based on the motion model of the autonomous truck considering the disturbance and uncertainties during operations associated with the autonomous truck.

A method of obtaining a data-driven model for autonomous driving comprises obtaining a first set of data associated with a first set of variables that characterize movements of an autonomous vehicle over time and commands provided to the autonomous vehicle over time, determining, using a first matrix based on at least the first set of data, non-zero values and an associated second set of variables that describe a control model used to perform an autonomous driving operation of the autonomous vehicle, and calculating values for a feedback controller that describes a transfer function used to perform the autonomous driving operation of the autonomous vehicle driven on a road.

In some embodiments, the values for the feedback controller are based on at least the non-zero values of the control model and a disturbance value that describes a driving related disturbance experienced by the autonomous vehicle. In some embodiments, the values minimize one or more errors associated with one or more commands provided by the feedback controller to compensate for the driving related disturbance. In some embodiments, the first matrix is obtained by: constructing a second matrix that includes the first set of data and a second set of data derived by performing mathematical operations on the first set of data; constructing a third matrix comprising derivatives of the first set of data over time; and deriving the first matrix by using a minimization function on the second matrix and the third matrix.

In some embodiments, the second matrix includes constant values, and wherein the second set of data includes data calculated as polynomial functions or trigonometric functions of the first set of variables, and the associated second set of variables correspond to one or more of the polynomial functions or the trigonometric functions of the first set of variables. In some embodiments, each row of the second matrix and the third matrix describes data associated with a same time, and at least some columns of the second matrix and the third matrix describes data associated with a command provided to the autonomous vehicle over time. In some embodiments, the first set of variables that characterize the movements of the autonomous vehicle include a longitudinal velocity of the autonomous vehicle, and a lateral velocity of the autonomous vehicle.

In some embodiments, the method further includes performing the autonomous driving operation by sending a steering command to a steering motor based on at least the calculated values of the feedback controller. In some embodiments, the values for the feedback controller are based on at least the non-zero values of the control model. In some embodiments, the calculated values minimize one or more errors associated with one or more commands provided by the feedback controller. In some embodiments, the first matrix is obtained by: constructing a second matrix that includes the first set of data and a second set of data derived by performing mathematical operations on the first set of data; constructing a third matrix comprising derivatives of the first set of data over time; and deriving the first matrix by using a sparse regression technique on the second matrix and the third matrix.

In some embodiments, the sparse regression technique includes using a minimization function. In some embodiments, the first set of data includes a first set of samples obtained from a tractor portion of the autonomous vehicle and a second set of samples obtained from a trailer portion of the autonomous vehicle. In some embodiments, at least some columns of the second matrix and the third matrix describes data associated with a movement of the autonomous vehicle. In some embodiments, the first set of variables that characterize the movements of the autonomous vehicle include an angular velocity of a tractor portion of the autonomous vehicle, and an angular velocity of a trailer portion of the autonomous vehicle. In some embodiments, the values for the feedback controller are based on the non-zero values of the control model, a disturbance value that describes a driving related disturbance experienced by the autonomous vehicle during a driving operation, and a frequency of a reference line on the road. In some embodiments, the reference line includes a lane marker on a road. In some embodiments, the driving related disturbance includes wind blowing on the autonomous vehicle or the autonomous vehicle driving through a pothole or a speed bump.

In yet another exemplary aspect, the above-described method is embodied in the form of processor-executable code and stored in a computer-readable program medium or a computer-readable storage medium. Thus, a non-transitory computer readable storage medium can have code stored thereon, where the code, when executed by a processor, causes the processor to implement the method described in this patent document.

In yet another exemplary embodiment, an apparatus or device or system that includes computer that includes a processor and a memory comprising instructions that, when executed by the processor, configure the processor to perform the above-described methods is disclosed.

The above and other aspects and their implementations are described in greater detail in the drawings, the descriptions, and the claims.

DETAILED DESCRIPTION

Figure 1:
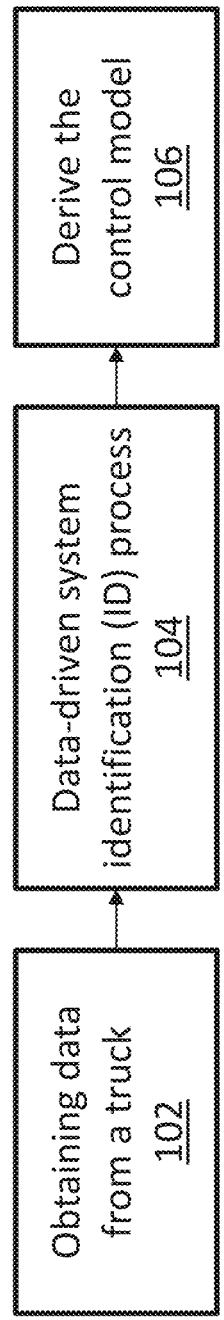
FIG. 1 shows an exemplary system identification process to determine a control model based on data provided by a semi-trailer truck FIG. 2 further describes an exemplary control design process to determine a design for a feedback controller operated in an autonomous vehicle.

From the time automobiles were introduced to streets over a century ago, at which time the automobiles were fully controlled by the driver, to now, more and more control of the driving of any automobile is now performed by an on-board computer. Over a number of years after their initial introduction, automobile navigation and control functions are more and more being performed automatically and lesser and lesser with direct human control.

In the recent years, there has been a lot of research and development in developing software and hardware that can lead to completely autonomous vehicles that are able to drive an automobile without any human control. The gradual progression of automobiles from the early days of "manual everything" to the near future "computer everything" driving models is sometimes captured with levels of automation. For example, the early automobiles where a human controlled the entire operation, are called "L0" level cars. In an L1 autonomous vehicle, a human operator still controls the vehicle, but several functions such as stability control, throttle/cruise control etc. are being performed by computers. In L2 vehicles, computers take on additional tasks such as monitoring vehicles around it, observing lane control, and so on. For L3 vehicles, it is expected that the automobile will be able to completely navigate itself, but will still require a human driver to be in the driver seat for intervention, if needed. L4 and L5 cars are expected to drive themselves in almost all environments and without human intervention. L4 cars may defer to a human driver in difficult situations such as adverse weather events or unusual topographies, whereas L5 cars will be capable of driving exactly like, or better than, a human driver.

In L4/L5 autonomous driving solution, a human driver is not required in the vehicle. However, for other vehicles and pedestrians around the autonomous vehicle, it would be beneficial if the autonomous vehicles appear to be behaving similar to expectations of the drivers of nearby vehicles.

In some embodiments described in the present document, a control system may be implemented on an on-board computer system of an autonomous vehicle to learn from the surrounding and also previous driving experience and use the training to navigate the autonomous vehicle. For example, a model-based control algorithm may be used, where the model may be constantly upgraded based on learned experiences.

To develop a model-based control algorithm, governing equations (also called model) can be developed to describe and predict the motion of the autonomous vehicle. Conventional modeling techniques for vehicle systems start by describing the momentum and energy, then derive the equations of motion with Newton's law or Lagrangian equations. The parameters of the equations may include physical parameters such as friction coefficients, damping coefficients, gravity constants, etc. Based on the equations of motions and physical-based parameters, engineers construct the control rules for a vehicle.

However, conventional modeling techniques have several technical problems or deficiencies. For example, the equations of motion derived from classical mechanics are too complicated for the purpose of obtaining a control rule. This shortcoming is especially prominent for a model used for a truck such as a semi-trailer truck. Another technical problem is that there is usually a mismatch between the equations of motion and the operations of the vehicles. To mitigate this mismatch, the control model needs to be manually adjusted which can be time consuming and inefficient. Also, due to the mismatch between the model and actual vehicle, the control algorithm requires tuning based on experiments to achieve desired performances. This process can also be time consuming and inefficient.

To overcome at least the above-mentioned technical problems with conventional modeling techniques, this patent documents describes a data-driven control system that includes a system identification process and a control design process. The parameters and corresponding values for the control model can be used by a software controller onboard an autonomous vehicle to provide commands (e.g., steering command or throttle/acceleration command) to the autonomous vehicle. In the system identification process, the coefficients associated with terms in the equations dictate the control model of the vehicle. In the controller design process, these coefficients are used to develop a controller algorithm, which is used to operate an autonomous vehicle.

FIG. 1 shows an exemplary system identification process to determine a control model based on data provided by a semi-trailer truck. The system identification process uses a sparse regression technique to derive a control model for the control design process. The structure of the control model is governed by a number of terms related to vehicle dynamics for a truck model.

As shown in FIG. 1, the first part of the system identification process includes obtaining data from a true truck 102 where the data is measured by the onboard sensors when the truck is in operation. The collected data are sampled at time $t_1, t_2, \ldots, t_N$ by a data acquisition device located in the truck. Accordingly, the data is stored in a computer located in the truck along with a timestamp when the data was acquired or sampled. The measured data relates to the number of terms used to derive the control model. The system identification module of another computer (shown as 425 in FIG. 4) obtains from the computer located in the truck the data with timestamp.

The system identification process uses the measured data associated with a number of states and a number of inputs (collectively referred to as number of terms). The number of states can include the longitudinal velocity $v_x$, the lateral velocity $v_y$, the angular velocity of a tractor unit of a semi-trailer truck $\dot{\Psi}$, and the angular velocity of a trailer unit of a semi-trailer truck $\dot{\psi}_f$. In a semi-trailer truck, the tractor unit is located in the front and includes the engine and a cab for the driver, and the trailer unit is located in the rear of the tractor unit and can include goods. The data related to the number of states can be measured by an inertial measurement unit (IMU) located on the autonomous vehicle. The number of inputs include the commanded steering angle δ and the commanded acceleration a (also known as throttle).

A system identification module obtains the data for the state variables and the inputs in the second part of the data-driven system identification (ID) process 104 (shown in FIG. 1) along with the time values associated with when the data was collected or sampled. To determine the truck control model from the data, the system identification module obtains the collected data of the states ($v_x$, $v_y$, $\dot{\psi}$, $\dot{\psi}_f$) and the input (δ, a) over a known or pre-determined time period, and the system identification module calculates the derivative of states ($v_x$, $v_y$, $\dot{\psi}$, $\dot{\psi}_f$) with respect to time. Since the collected data are sampled at time $t_1, t_2, \ldots, t_N$ by a data acquisition device located in the truck, the data related to states and inputs are shown below in the temporal signal sequence with index 1, . . . , N. The collected data of the states $v_x$, $v_y$, $\dot{\psi}$, $\dot{\psi}_f$ describes a first set of samples from a tractor portion of the autonomous vehicle and a second set of samples from a trailer portion of the autonomous vehicle.

States longitudinal velocity [$v_x(1)$, $v_x(2)$, . . . , $v_x(N)$],
lateral velocity [$v_y(1)$, $v_y(2)$, . . . , $v_y(N)$],
tractor's yaw rate [$\psi(1)$, $\psi(2)$, . . . , $\psi(N)$],
trailer angular velocity [$\psi_f(1)$, $\psi_f(2)$, . . . , $\psi_f(N)$], Inputs steer angle [δ(1), δ(2), . . . , δ(N)],
longitudinal acceleration [a(1), a(2), . . . , c(N)].

Derivatives longitudinal acceleration [$\dot{v}_x(1)$, $\dot{v}_x(2)$, . . . , $\dot{v}_x(N)$],
lateral acceleration [$\dot{v}_y(1)$, $\dot{v}_y(2)$, . . . , $\dot{v}_y(N)$],
tractor's yaw acceleration [$\ddot{\psi}(1)$, $\ddot{\psi}(2)$, . . . , $\ddot{\psi}(N)$],
trailer angular acceleration [$\ddot{\psi}_f(1)$, $\ddot{\psi}_f(2)$, . . . , $\ddot{\psi}_f(N)$], In some embodiments, the time instances for obtaining the data may be controlled. For example, a uniform sampling may be used during normal operation of the vehicle. If a critical phase is sensed, then the sampling instances may be adjusted. For example, a faster data collection in a rapidly changing environment (e.g., vehicle traveling at a higher speed) compared to a stationary environment (e.g., vehicle driving at relatively slower speeds, such as less than 20 mph, or in a highway setting where there are no significant changes to surrounding).

The system identification module constructs a library (or matrix) that can include nonlinear functions of states and inputs which may not include derivatives of the states. This nonlinear functions can serve as candidate components for the system. In this case, the library Ω shown below includes constant values, polynomial function of the states and/or inputs, and trigonometric functions of the states and/or inputs, where each row of the matrix library Ω describes data associated with a same time, and where each column of the matrix library Ω describes data associated with a movement of the vehicle or a command provided to the vehicle over time:

$$\Omega = \begin{bmatrix} 1 & v_x(1) & \cdots & a(1) & v_x^2(1) & v_x(1)v_y(1) & \cdots & \dot{\psi}_f^2(1) & \cdots \\ 1 & v_x(2) & \cdots & a(2) & v_x^2(2) & v_x(2)v_y(2) & \cdots & \dot{\psi}_f^2(2) & \cdots \\ \vdots & \vdots & & \vdots & \vdots & \vdots & & \vdots & \\ 1 & v_x(N) & \cdots & a(N) & v_x^2(N) & v_x(N)v_y(N) & \cdots & \dot{\psi}_f^2(N) & \cdots \end{bmatrix}$$

A technical benefit of using a library that can include nonlinear functions of states and inputs is that it can be designed to include any number of entries to be included in the library. Thus, the library can be flexibly designed to yield a control model. Another technical benefit of using a library is that unlike conventional modeling techniques, the data-driven system identification process can be considered equation-free at least because the exemplary system identification process does not derive equations of motions using a conventional model structure given by physics laws.

The system identification module can also construct another matrix that can include derivatives of the states as shown below, where each row of the matrix describes derivative of data associated with a same time, and where each column of the matrix describes derivative of data associated with a movement of the vehicle or a command provided to the vehicle over time:

$$\dot{X} = [\dot{x}_1, \dot{x}_2, \dot{x}_3, \dot{x}_4]$$

$$:= \begin{bmatrix} \dot{v}_x(1) & \dot{v}_y(1) & \ddot{\psi}(1) & \ddot{\psi}_f(1) \\ \dot{v}_x(2) & \dot{v}_y(2) & \ddot{\psi}(2) & \ddot{\psi}_f(2) \\ \vdots & \vdots & \vdots & \vdots \\ \dot{v}_x(N) & \dot{v}_y(N) & \ddot{\psi}(N) & \ddot{\psi}_f(N) \end{bmatrix}$$

The data-driven system identification process 104 includes the system identification module solving for parameter matrix P using the following equation:

$$\dot{X} = \Omega P,$$

where P has the following structure:

$$P = [p_1, p_2, p_3, p_4]$$

$$:= \begin{bmatrix} p_1(1) & p_2(1) & p_3(1) & p_4(1) \\ p_1(2) & p_2(2) & p_3(2) & p_4(2) \\ \vdots & \vdots & \vdots & \vdots \\ p_1(m) & p_2(m) & p_3(m) & p_4(m) \end{bmatrix}$$

The entries in P (e.g., parameters and associated values of P) can be used to derive the control model (shown as 106 in FIG. 1). When one entry of P is 0, the corresponding item in Ω is considered inactive and does not show up or is not included in the control model. A technical benefit of using matrix P is that the non-zero terms of matrix P and their associated values that can describe the control model include only a few terms which makes the matrix P sparse and computationally feasible.

To solve for P, the system identification module solves for $p_1$ to $p_4$ with 4 optimization problems as shown below:

$$\min_{p_i} \|\dot{x}_i - \Omega p_i\|_2 + \lambda \|p_i\|_1, \text{ for } i = 1, 2, 3, 4.$$

At this step, the system identification problem is converted as four Lasso optimization problems, which can be solved with convex solvers. The system identification module uses a minimization function with the library $\Omega$ and matrix $\dot{X}$ to derive optimal values for the parameter matrix P, as described in the optimization question shown above in this paragraph. Thus, by using the minimization function, the system identification module uses a sparse regression technique to determine the fewest parameters (or variables) in the dynamics governing equations required to accurately represent the physical control model. Thus, the system identification module obtains a truck or vehicle control model with the parameter matrix P that includes a set of non-zero values and associated variables from library $\Omega$. Thus, the non-zero terms of the vector from library $\Omega$ dictate or determine the active terms of the equations of motion.

Figure 5:
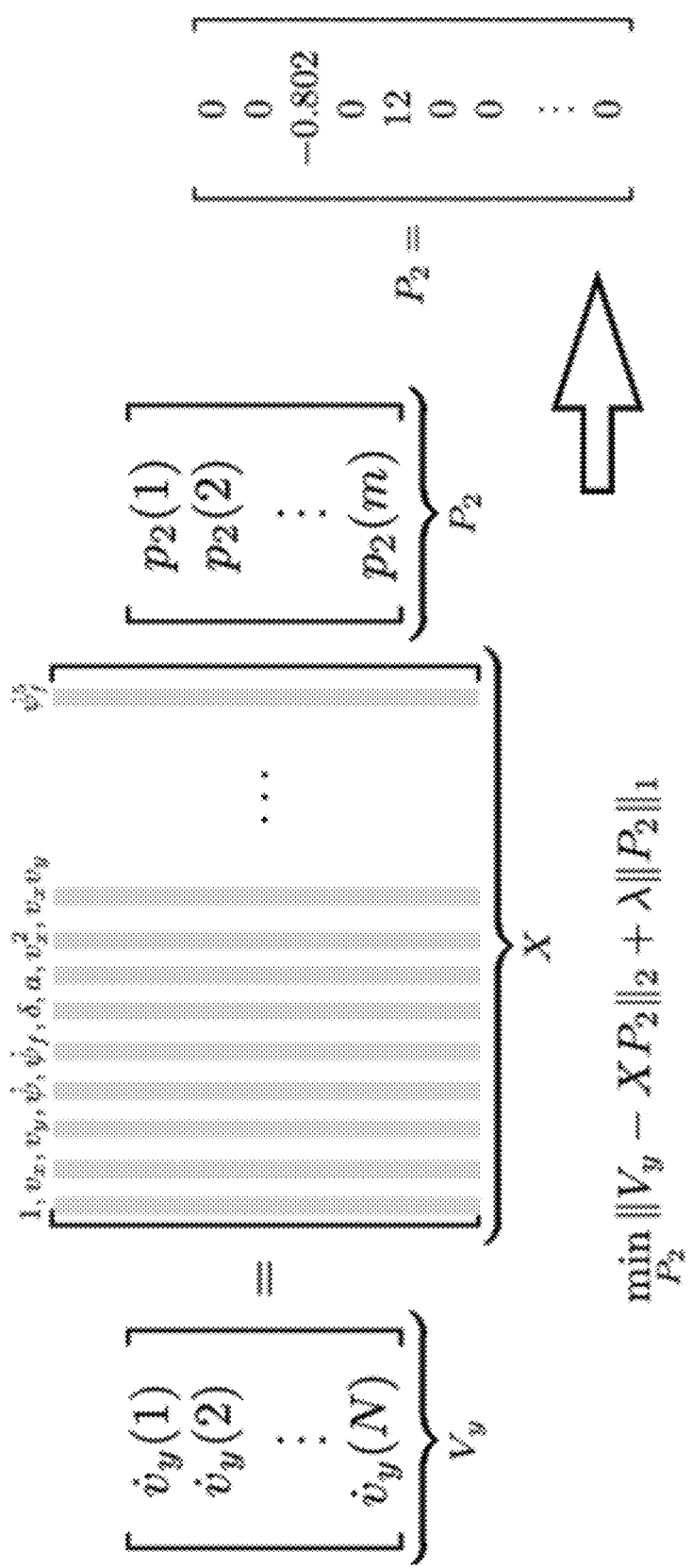
FIG. 5 shows an example of a computation performed for a lateral velocity $v_y$ channel to derive a control model.

FIG. 5 shows an example of a computation performed for the lateral velocity $v_y$ channel where a set of non-zero values obtained for $p_2$ and the corresponding parameters from the matrix X (referred to as library $\Omega$ above) describe in part a control model. Thus, as shown in FIG. 1, the output of the system identification module is a control model that is described using a set of non-zero values from parameter matrix P and the variables from library $\Omega$ that correspond to the non-zero values.

Figure 2:
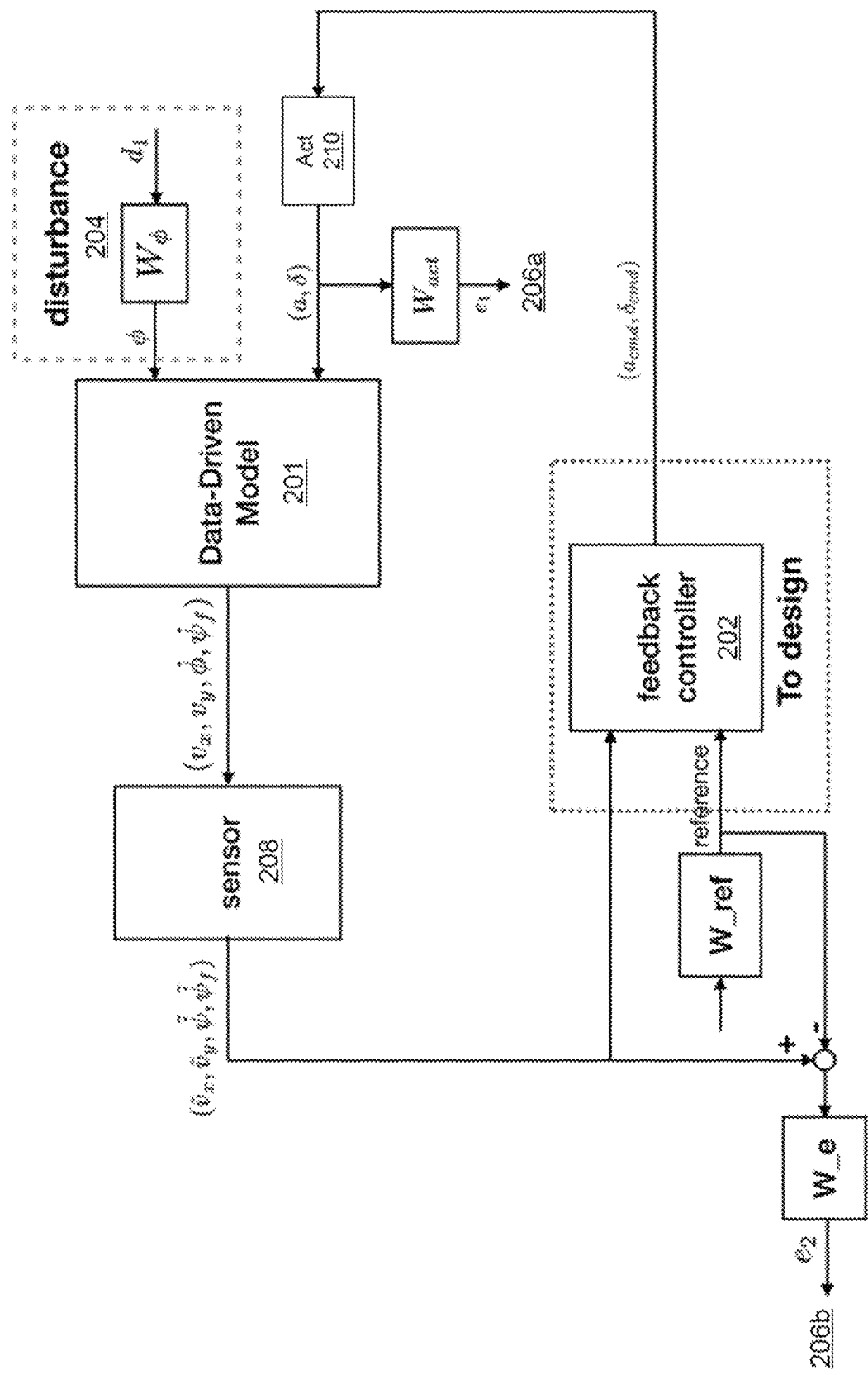

FIG. 2 further describes an exemplary control design process to determine a design for a feedback controller 202 operated in an autonomous vehicle. The control design process includes a data-driven model 201 that includes the non-zero values of the parameter matrix P derived from the system identification process as explained in this patent document. The control design process also includes a sensor model 208 that provides sensed values $\tilde{v}_x, \tilde{v}_y, \tilde{\psi}, \tilde{\psi}_f$ for the states $v_x, v_y, \psi, \psi_f$. In FIG. 2, W_ref is a frequency property of a reference line (e.g., lane markers) on a road as determined by a computer located in the autonomous vehicle. The actuator model 210 is a model of an actuator such as a motor to steer the autonomous vehicle or a motor to control an amount of throttle of the autonomous vehicle. A disturbance 204 may be characterized (or measured) as a value and may be caused by wind blowing on the truck or may be caused by a driving condition (e.g., truck driving through a pothole or a speed bump).

After the parameters and the corresponding non-zero values of the control model are identified by the system identification module, a control design module of the computer (shown as 430 in FIG. 4) can perform a μ-synthesis design or $\mathcal{H}\infty$ controller synthesis to generate the feedback controller 202 as further described below. The feedback controller 202 can be a module (shown as 435 in FIG. 4) operated in a computer on an autonomous vehicle. The feedback controller 202 can be considered a control system transfer function that can output an acceleration command ($a_{cmd}$) or steering command ($\delta_{cmd}$) based on the transfer function and input values obtained from the sensor 208. The control design module can use two robust controllers: $\mathcal{H}\infty$ optimal controller and μ-synthesis controller to perform its operations. The $\mathcal{H}\infty$ optimization and μ-synthesis can be used to identify a controller that can stabilize the example closed loop system shown in FIG. 2.

FIG. 2 shows the design block diagram of the two robust controllers in a closed loop system. The $\mathcal{H}\infty$ control design can minimize the $\mathcal{H}\infty$ norm of the closed-loop system caused by the disturbance 204 to produce the errors e1 (206a) and e2 (206b). The $\mathcal{H}\infty$ norm of the closed-loop system (denoted as $\|G_{d \to e}\|_\infty$) is considered the scale of effect on the tracking error and actuation signal due to disturbances. The notation $\|G_{d \to e}\|_\infty$ can determine a maximum value of G for a disturbance that causes an error. In FIG. 2, the feedback controller 202 can be designed so that under certain disturbance value $d_1$, the error value $e_2$ and actuation error $e_1$ is minimized. The actuation error value $e_1$ can be considered the error caused by the acceleration command or steering command provided by the feedback controller 202 in response to the disturbance value $d_1$. The block diagram in FIG. 2 shows that the truck model or the data-driven model 201, the sensor model 208, and the actuator model 210 is considered in the design process for designing the feedback controller. The control design module uses the μ-synthesis control to minimize $\|G_{d \to e}\|_\infty$ considering uncertainties in the truck model.

Using the μ-synthesis method, the control design module can design a feedback controller 202 by taking into account parameter uncertainty, dynamic uncertainty, input disturbance, and sensor noise into consideration. With pre-determined performance metrics and a data-driven model, the control design process can be automatic.

Figure 3:
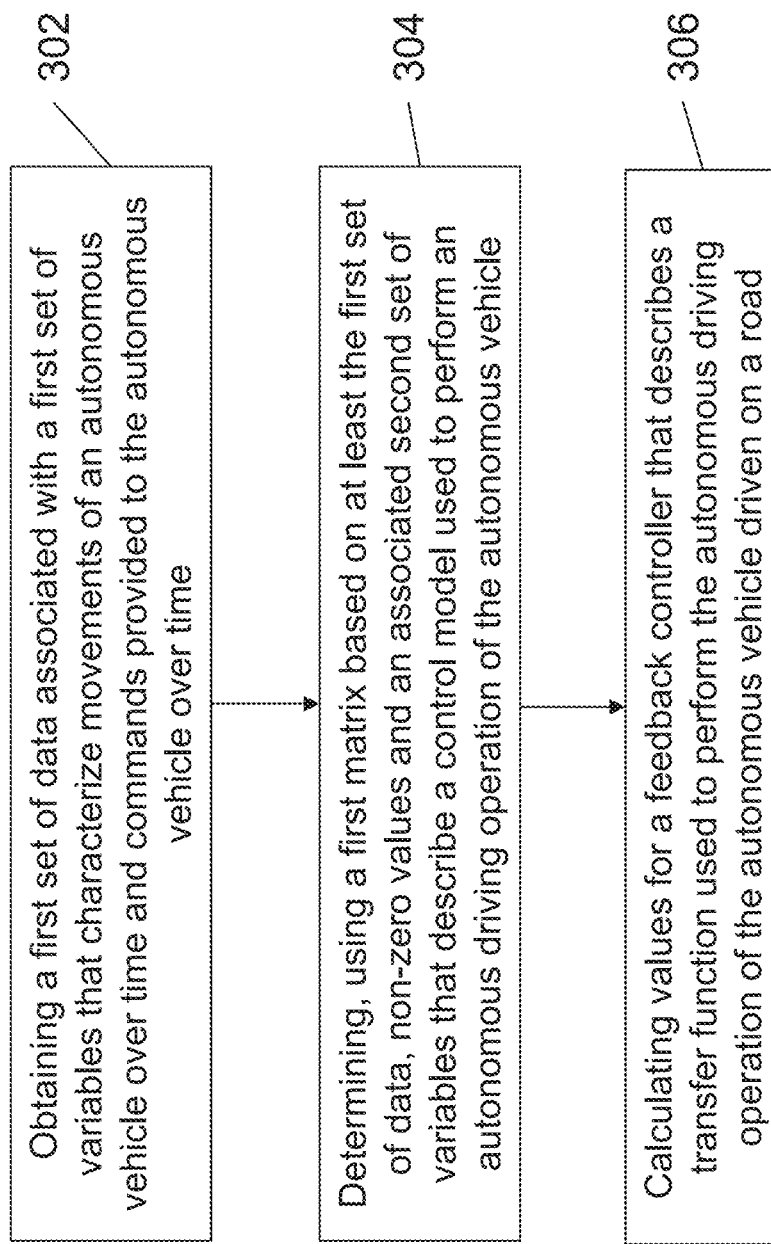
FIG. 3 shows a flowchart of an exemplary technique to obtain a data-driven control model and to design a feedback controller.

FIG. 3 shows a flowchart of an exemplary technique to obtain a data-driven control model and to design a feedback controller. Operation 302 includes obtaining a first set of data associated with a first set of variables that characterize movements of an autonomous vehicle over time and commands provided to the autonomous vehicle over time. Operation 304 includes determining, using a first matrix based on at least the first set of data, non-zero values and an associated second set of variables that describe a control model used to perform an autonomous driving operation of the autonomous vehicle. Operation 306 includes calculating values for a feedback controller that describes a transfer function used to perform the autonomous driving operation of the autonomous vehicle driven on a road. In some embodiments, the values for the feedback controller are based on at least the non-zero values of the control model. In some embodiments, the values for the feedback controller are based on at least the non-zero values of the control model and a disturbance value that describes a driving related disturbance experienced by the autonomous vehicle driven on the road.

In some embodiments, the calculated values minimize one or more errors associated with one or more commands provided by the feedback controller to compensate for the driving related disturbance. In some embodiments, the first matrix is obtained by: constructing a second matrix that includes the first set of data and a second set of data derived by performing mathematical operations on the first set of data; constructing a third matrix comprising derivatives of the first set of data over time; and deriving the first matrix by using a sparse regression technique on the second matrix and the third matrix. In some embodiments, the sparse regression technique includes using a minimization function.

In some embodiments, the second matrix includes constant values, and wherein the second set of data includes data calculated as polynomial functions or trigonometric functions of the first set of variables, and the associated second set of variables correspond to one or more of the polynomial functions or the trigonometric functions of the first set of variables.

In some embodiments, each row of the second matrix and the third matrix describes data associated with a same time, and at least some columns of the second matrix and the third matrix describes data associated with a command provided to the autonomous vehicle over time. In some embodiments, at least some columns of the second matrix and the third matrix describes data associated with a movement of the autonomous vehicle. In some embodiments, the first set of variables that characterize the movements of the autonomous vehicle include a longitudinal velocity of the autonomous vehicle, and a lateral velocity of the autonomous vehicle. In some embodiments, the first set of variables that characterize the movements of the autonomous vehicle includes an angular velocity of a tractor portion of the autonomous vehicle, and an angular velocity of a trailer portion of the autonomous vehicle. In some embodiments, the first set of variables that characterize the commands provided to the autonomous vehicle include a steering angle commanded to the autonomous vehicle and an acceleration or throttle command commanded to the autonomous vehicle. In some embodiments, the method of FIG. 3 further includes performing the autonomous driving operation by sending a throttle command to an engine or a steering command to a steering motor based on at least the calculated values of the feedback controller.

Figure 4:
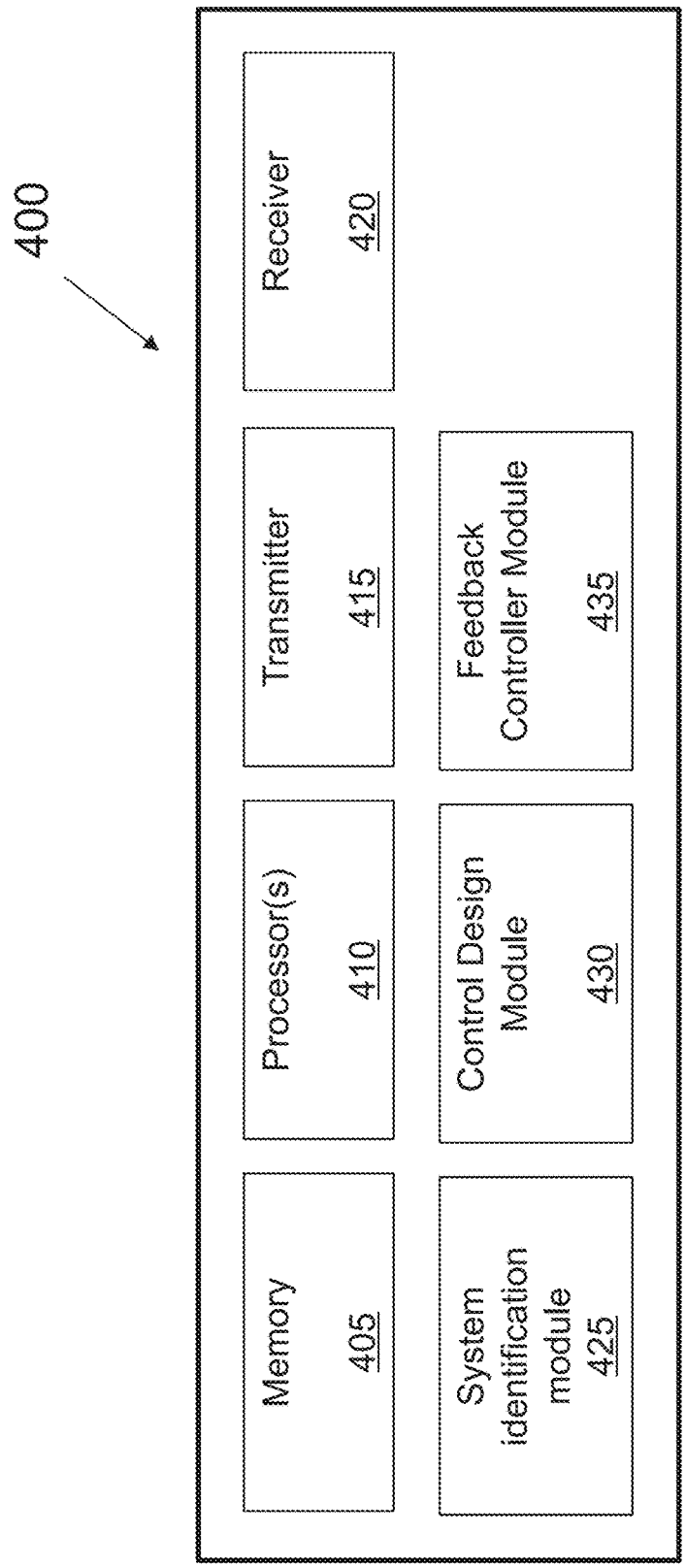
FIG. 4 shows an exemplary block diagram of a computer or server that may be operated in an autonomous vehicle.

FIG. 4 shows an exemplary block diagram of a computer or server 400 that may be operated in an autonomous vehicle. The computer 400 includes at least one processor 410 and a memory 405 having instructions stored thereupon. The instructions upon execution by the processor 410 configure the computer 400 to perform the operations described for the various modules as described in FIGS. 1 to 3 and 5, and/or the operations described in the various embodiments or sections in this patent document.

Compared to conventional modeling techniques, the data-driven control modeling techniques can provide at least the following technical benefits. First, the data-driven model can provide a concise model distilled from data that reflects the true behavior of the vehicle system, where the complexity of the model is governed by the algorithm used by the system identification module. Second, the data-driven control model can reduce the mismatch mentioned for conventional technology at least because the control model is derived from the input-output signal (e.g., states and inputs). With the sparsity algorithm employed by the system identification module, one can easily strike a balance between model complexity and model accuracy. The proposed control design can enable a robust margin (how much uncertainty and disturbance can be handled) with minimum tuning of a controller. Furthermore, the controller structure, compared with some traditional controller, is simpler.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of obtaining a data-driven model for autonomous driving, the method comprising:

obtaining a first set of data associated with a first set of variables that characterize movements of an autonomous vehicle over time and commands provided to the autonomous vehicle over time;

determining, using a first matrix based on at least the first set of data, non-zero values and an associated second set of variables that describe a control model used to perform an autonomous driving operation of the autonomous vehicle;

calculating values for a feedback controller that describes a transfer function used to perform the autonomous driving operation of the autonomous vehicle driven on a road, wherein the values for the feedback controller are based on at least the non-zero values of the control model and a measured disturbance value that describes a driving related disturbance experienced by the autonomous vehicle;

outputting, by the feedback controller operated in the autonomous vehicle, an acceleration command and a steering command for the autonomous vehicle based on the values for the feedback controller and based on a longitudinal velocity, a lateral velocity, a yaw rate, and an angular velocity sensed by sensors on the autonomous vehicle; and causing a steering motor and an engine of the autonomous vehicle to actuate to perform the autonomous driving operation by sending the steering command to the steering motor and the acceleration command to the engine.

2. The method of claim 1, wherein the values minimize one or more errors associated with one or more commands provided by the feedback controller to compensate for the driving related disturbance.

3. The method of claim 1, wherein the first matrix is obtained by:
constructing a second matrix that includes the first set of data and a second set of data derived by performing mathematical operations on the first set of data;
constructing a third matrix comprising derivatives of the first set of data over time; and
deriving the first matrix by using a minimization function on the second matrix and the third matrix.

4. The method of claim 3,
wherein the second matrix includes constant values, and wherein the second set of data includes data calculated as polynomial functions or trigonometric functions of the first set of variables, and wherein the associated second set of variables correspond to one or more of the polynomial functions or the trigonometric functions of the first set of variables, wherein the associated second set of variables describe the control model used to perform the autonomous driving operation of the autonomous vehicle.

5. The method of claim 3,
wherein each row of the second matrix and the third matrix describes data associated with a same time, and
wherein at least some columns of the second matrix and the third matrix describes data associated with a command provided to the autonomous vehicle over time.

6. The method of claim 1, wherein the first set of variables that characterize the movements of the autonomous vehicle include the longitudinal velocity of the autonomous vehicle, and the lateral velocity of the autonomous vehicle.

7. A non-transitory computer readable storage medium having code stored thereon, the code, when executed by a processor, causing the processor to implement a method comprising:
obtaining a first set of data associated with a first set of variables that characterize movements of an autonomous vehicle over time and commands provided to the autonomous vehicle over time;
determining, using a first matrix based on at least the first set of data, non-zero values and an associated second set of variables that describe a control model used to perform an autonomous driving operation of the autonomous vehicle;
calculating values for a feedback controller that describes a transfer function used to perform the autonomous driving operation of the autonomous vehicle driven on a road, wherein the values for the feedback controller are based on at least the non-zero values of the control model and a measured disturbance value that describes a driving related disturbance experienced by the autonomous vehicle;

outputting, by the feedback controller operated in the autonomous vehicle, an acceleration command and a steering command for the autonomous vehicle based on the values for the feedback controller and based on a longitudinal velocity, a lateral velocity, a yaw rate, and an angular velocity sensed by sensors on the autonomous vehicle; and causing a steering motor and an engine of the autonomous vehicle to actuate to perform the autonomous driving operation by sending the steering command to the steering motor and the acceleration command to the engine.

8. The non-transitory computer readable storage medium of claim 7, wherein the calculated values minimize one or more errors associated with one or more commands provided by the feedback controller.

9. The non-transitory computer readable storage medium of claim 7, wherein the first matrix is obtained by:
constructing a second matrix that includes the first set of data and a second set of data derived by performing mathematical operations on the first set of data;
constructing a third matrix comprising derivatives of the first set of data over time; and
deriving the first matrix by using a sparse regression technique on the second matrix and the third matrix.

10. The non-transitory computer readable storage medium of claim 9, wherein the sparse regression technique includes using a minimization function.

11. The non-transitory computer readable storage medium of claim 9, wherein the first set of data includes a first set of samples obtained from a tractor portion of the autonomous vehicle and a second set of samples obtained from a trailer portion of the autonomous vehicle.

12. The non-transitory computer readable storage medium of claim 9, wherein at least some columns of the second matrix and the third matrix describes data associated with a movement of the autonomous vehicle.

13. The non-transitory computer readable storage medium of claim 7, wherein the first set of variables that characterize the movements of the autonomous vehicle include an angular velocity of a tractor portion of the autonomous vehicle, and an angular velocity of a trailer portion of the autonomous vehicle.

14. A system, comprising: a processor, and a memory comprising instructions that, when executed by the processor, configure the processor to:
obtain a first set of data associated with a first set of variables that characterize movements of an autonomous vehicle over time and commands provided to the autonomous vehicle over time;
determine, using a first matrix based on at least the first set of data, non-zero values and an associated second set of variables that describe a control model used to perform an autonomous driving operation of the autonomous vehicle;
calculate values for a feedback controller that describes a transfer function used to perform the autonomous driving operation of the autonomous vehicle driven on a road, wherein the values for the feedback controller are based on at least the non-zero values of the control model and a measured disturbance value that describes a driving related disturbance experienced by the autonomous vehicle;

output, by the feedback controller operated in the autonomous vehicle, an acceleration command and a steering command for the autonomous vehicle based on the values for the feedback controller and based on a longitudinal velocity, a lateral velocity, a yaw rate, and an angular velocity sensed by sensors on the autonomous vehicle; and cause a steering motor and an engine of the autonomous vehicle to actuate to perform the autonomous driving operation by sending the steering command to the steering motor and the acceleration command to the engine.

15. The system of claim 14, wherein the values for the feedback controller are based on a frequency of a reference line on the road.

16. The system of claim 15, wherein the reference line includes a lane marker on the road.

17. The system of claim 15, wherein the driving related disturbance includes wind blowing on the autonomous vehicle or the autonomous vehicle driving through a pothole or a speed bump.

18. The system of claim 14, wherein the first matrix is obtained by the processor configured to:

construct a second matrix that includes the first set of data and a second set of data derived by performing mathematical operations on the first set of data;

construct a third matrix comprising derivatives of the first set of data over time; and derive the first matrix by using a sparse regression technique on the second matrix and the third matrix.

* * * * *